(12) United States Patent
Hernandez

(10) Patent No.: US 8,142,019 B2
(45) Date of Patent: Mar. 27, 2012

(54) DOLLY AND TRACK SYSTEM

(76) Inventor: Charles Hernandez, Rosemead, CA (US)

( * ) Notice: Subject to any disclaimer, the term of this patent is extended or adjusted under 35 U.S.C. 154(b) by 465 days.

(21) Appl. No.: 12/484,862

(22) Filed: Jun. 15, 2009

(65) Prior Publication Data
US 2009/0315288 A1 Dec. 24, 2009

Related U.S. Application Data

(60) Provisional application No. 61/132,693, filed on Jun. 23, 2008.

(51) Int. Cl.
B62B 1/00 (2006.01)
(52) U.S. Cl. .................. 352/243; 396/419; 348/373
(58) Field of Classification Search .................. 352/242, 352/243; 396/419, 428; 248/298.1, 346.03, 248/346.06; 348/373; 33/1 M
See application file for complete search history.

(56) References Cited

U.S. PATENT DOCUMENTS

| | | | |
|---|---|---|---|
| 1,943,360 A | 1/1934 | Arnold | |
| 2,312,273 A | 2/1943 | Stochmal | |
| 2,448,084 A | 8/1948 | Davis | |
| 2,932,478 A | 4/1960 | Krieger | |
| 2,952,411 A | 9/1960 | Hand | |
| 3,422,565 A | 1/1969 | Kentfield et al. | |
| D221,634 S | 8/1971 | Bradspies et al. | |
| 3,598,355 A | 8/1971 | English | |
| 4,003,584 A | 1/1977 | Zelli | |
| 4,241,988 A | 12/1980 | Lepp | |
| 4,614,502 A | 9/1986 | Nelson | |
| 4,699,484 A | 10/1987 | Howell et al. | |
| 4,802,622 A | 2/1989 | Homan | |
| 5,061,000 A | 10/1991 | Haugen et al. | |
| D338,030 S | 8/1993 | Chapman | |
| 5,312,121 A | 5/1994 | Chapman | |
| D376,460 S | 12/1996 | Isaia et al. | |
| 5,609,108 A | 3/1997 | Chapman | |
| 5,711,227 A * | 1/1998 | Johnson | 104/126 |
| 5,716,062 A | 2/1998 | Lindsay | |
| 5,887,787 A | 3/1999 | Saldana, III | |
| 6,360,673 B1 | 3/2002 | Herrin et al. | |
| 6,435,421 B1 | 8/2002 | Peterson | |
| 6,523,957 B1 * | 2/2003 | Walton et al. | 352/243 |
| 6,557,775 B1 | 5/2003 | Brinson et al. | |
| 6,775,475 B1 * | 8/2004 | Traver | 396/1 |
| 7,552,213 B2 * | 6/2009 | De Oliveira et al. | 709/224 |
| 7,794,088 B1 * | 9/2010 | Saad et al. | 352/243 |
| 7,891,888 B2 * | 2/2011 | Wood | 396/428 |
| 2002/0064386 A1 | 5/2002 | Losmandy | |
| 2005/0231689 A1 * | 10/2005 | Longley | 352/243 |
| 2007/0095246 A1 * | 5/2007 | Heiligenmann | 104/307 |
| 2007/0251408 A1 | 11/2007 | Fletcher et al. | |
| 2008/0315542 A1 | 12/2008 | Fisher | |
| 2008/0315543 A1 | 12/2008 | Fisher | |
| 2009/0212194 A1 * | 8/2009 | Wood | 248/647 |
| 2009/0309986 A1 * | 12/2009 | Mayer | 348/208.99 |

* cited by examiner

Primary Examiner — William C Dowling
(74) Attorney, Agent, or Firm — Tsircou Law, P.C.

(57) ABSTRACT

A dolly and track system is provided that includes a dolly assembly configured to enable tripod-mounted camera angles as well as low profile camera mountings. The camera plate can be positioned at prescribed locations on the dolly assembly to enable optimum view angles without concern for capturing the track or dolly in the field of view, particularly when shooting from a low profile. In this manner, the system provides users with multiple filming options, to include tripod use and low-profile filming, in a compact system.

19 Claims, 5 Drawing Sheets

DOLLY AND TRACK SYSTEM

CROSS REFERENCE TO RELATED APPLICATIONS

This application claims the benefit of U.S. Provisional Application No. 61/132,693, filed Jun. 23, 2008, which is incorporated by reference.

FIELD OF THE INVENTION

The present invention relates generally to moveable dolly systems for cameras and, more particularly, to such dollies mounted on track assemblies.

BACKGROUND OF THE INVENTION

Dolly and track systems have long been used in the film industry to help camera operators film scenes. These systems allow camera operators to control a camera without holding a camera in their hand and without the shakiness that is inherent when filming with a handheld camera. The dolly and track system also allows for swift movement of the camera when filming objects that are moving.

Ease of transport and assembly of a dolly and rail system is important, particularly when filming on location, considering time and cost associated with transport and assembly. Many of the current dolly and track systems are bulky and heavy, which make it difficult to transport and assemble these systems. Large trucks are often needed to carry the track systems for the dollies such complex systems.

In addition, current dolly systems are typically configured either for managing cameras to be mounted upon them by means of a tripod or for low-angle filming. The tripod systems are mounted fairly high above the track system. This is done to ensure that the dolly and track system is outside of the camera's field of view. As a result, current systems are ineffective in filming low-angled shots.

Current dolly and track systems that are designed specifically for low-angled shots but these systems typically have narrow tracks. The narrow tracks of these systems do not accommodate tripods and subsequently only serve one function. As a result, film crews often need separate systems to accommodate variety of camera angles that might be used.

It should, therefore, be appreciated that there remains a need for a dolly and track system that addresses the aforementioned shortcomings. The present invention fulfills these needs and others.

SUMMARY OF THE INVENTION

Briefly, and in general terms, the invention provides a dolly and track system configured to enable tripod-mounted camera angles as well as low profile camera mountings. The dolly is configured to receive a tripod for mounting a camera and further includes a moveable camera plate enabling the user to mount the camera for low-profile filming. The camera plate can be positioned at prescribed locations on the dolly assembly to enable optimum view angles without concern for capturing the track or dolly in the field of view, particularly when shooting from a low profile. In this manner, the system provides users with multiple filming options, to include tripod use and low-profile filming, in a compact system. In addition, the system can be used with two cameras simultaneously with a first camera mounted on a tripod and a second camera mounted on the moveable camera plate.

More particularly, and in an exemplary embodiment, the dolly assembly includes a triangular base, three wheel carriages disposed at the corners of the base to engage parallel rails of the track assembly, and a moveable camera plate having a pivot arm attached to the base and configured to be secured at multiple locations on the camera base.

In a detailed aspect of an exemplary embodiment, the triangular base includes a three base bars, each bar having ends removably coupled to the wheel carriages and further having central bar extending between two of the base bars, positioned to provide a securement location for the camera plate.

In another detailed aspect of an exemplary embodiment, the track assembly includes a plurality of cross members that extend between the parallel rails, the cross members having a folding joint in an intermediate region thereof to enable stowage of the track assembly, the track assembly can further include a locking brace configured to extend from a rail of the parallel rails to a cross member of the plurality of cross members.

In yet another exemplary embodiment, the base of the dolly assembly further includes an arcuate bar extending between opposing sides of the base and positioned to enable the camera plate to travel along the length of the arcuate bar to provide multiple securement locations for the camera plate to enable low-profile.

In yet another detailed aspect of an exemplary embodiment, the wheel carriages each include a pair of angled sidewalls terminating in a tip proximate to the corresponding rail. The plurality of wheels is attached generally parallel to a corresponding sidewall. Each of the wheel carriages can further define a recess for receiving a leg of a camera tripod. In selected embodiments, the wheel carriages can be configured for movement about an axis of rotation generally perpendicular to the base of the dolly assembly. The plurality of wheels of the wheel carriages can be mounted for radial displacement along the axis of rotation relative to the corresponding sidewall.

In yet another detailed aspect of an exemplary embodiment, the track assembly further includes a third rail generally spaced apart from and generally parallel to the pair of parallel rails, and the dolly assembly further includes a seat base configured to travel along the third rail in which the seat base is coupled to the triangular base to move along such that the seat base and the triangular base travel together along the track assembly.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
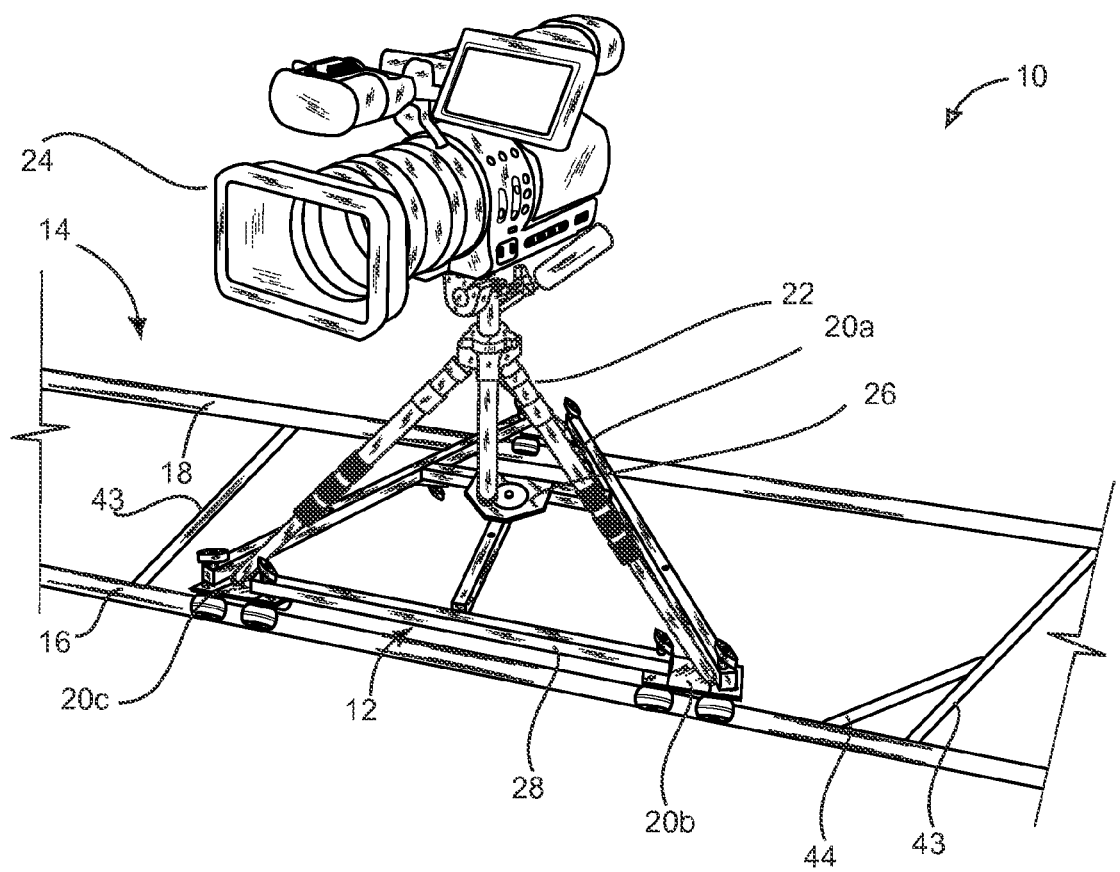
FIG. 1 is a perspective view of a dolly and track system in accordance with the present invention, depicting a camera tripod mounted on the dolly.
Figure 2:
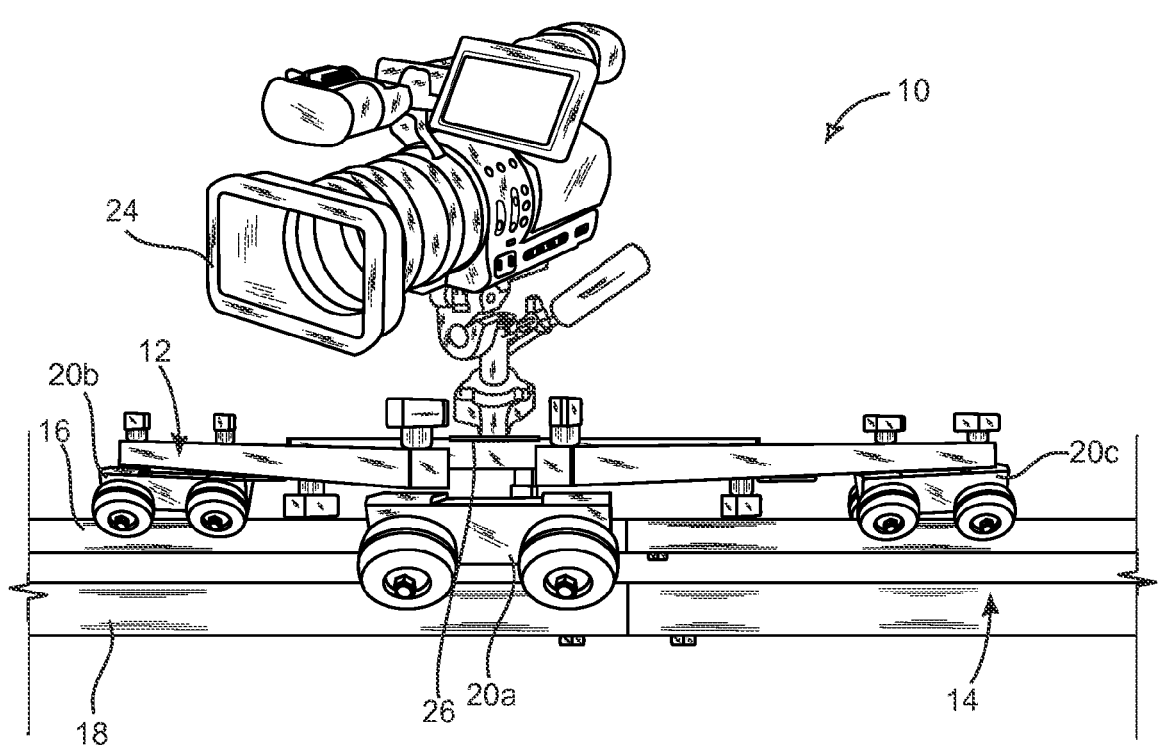
FIG. 2 is a perspective view of the dolly assembly of FIG. 1, depicting a camera mounted on a moveable camera plate of the dolly.

With reference now to the drawings, and particularly FIGS. 1 and 2, a dolly and track system 10 is shown, including a dolly 12 mounted for movement along a track assembly 14. The track assembly includes two parallel rails 16 and 18. The dolly includes a plurality of wheel carriages 20a-c spaced at prescribed locations on the dolly to glide along the rails. The dolly and track system provides a smooth ride for the mounted camera along the track.

Figure 3:
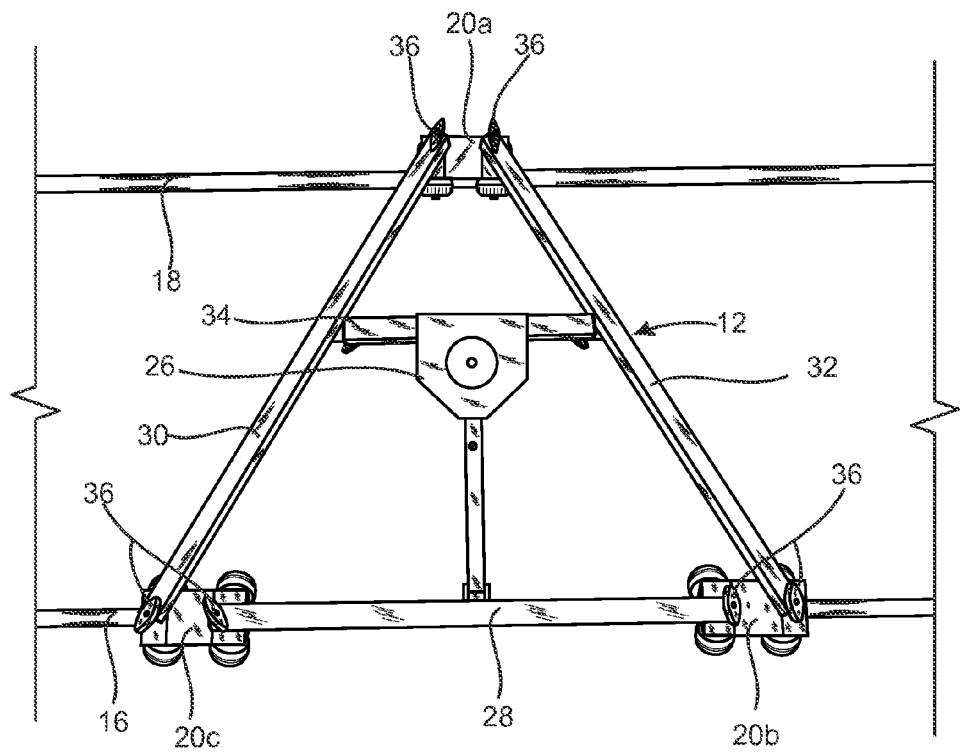
FIG. 3 is a perspective view of the dolly assembly of FIG. 1, depicting a camera plate in a center position.
Figure 4:
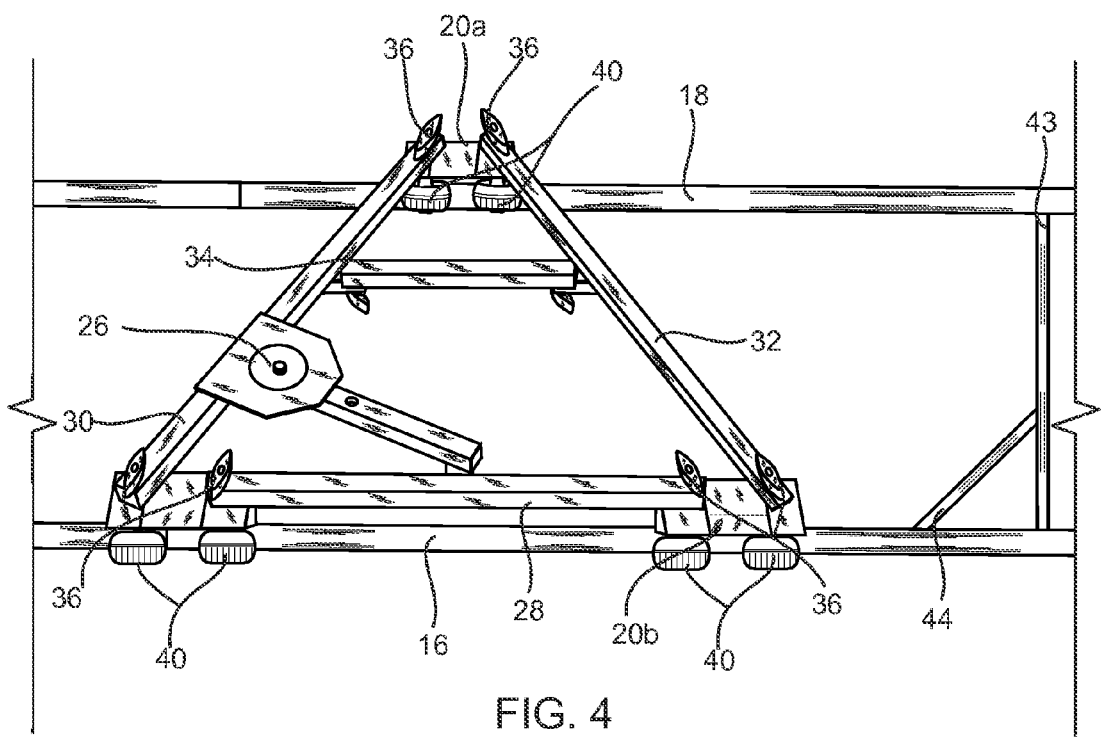
FIG. 4 is a perspective view of the dolly assembly of FIG. 1, depicting the camera plate in a first side position.

The dolly is configured to receive a tripod 22 for mounting a camera 24. As seen in FIG. 3, the dolly further includes a moveable camera plate 26 enabling the user to mount the camera for low-profile filming. The camera plate can be positioned at prescribed locations on the dolly assembly to enable optimum view angles without concern for capturing the track or dolly in the field of view, particularly when shooting from a low profile. In this manner, the system provides users with multiple filming options, to include tripod use and low-profile filming, in a compact system. The camera operator, therefore, can film while moving the camera in order to obtain different view angles of the desired scene while keeping the camera at a constant, steady level. In addition, the system can be used with two cameras simultaneously with a first camera on a tripod and a second camera mounted on the camera plate.

With reference to FIG. 3, the dolly assembly 12 has a triangular configuration, including three sidebars: a first sidebar 28 and two sidebars 30 and 32 angled relative to the rails 16, 18 of the track assembly 14. The dolly assembly further includes a central bar 34 parallel to the first sidebar, extending between sidebars 30 and 32. A central bar is also used to provide a central position to which the camera plate 26 can be positioned. The camera plate can also be attached to sidebars 30 and 32 depending on the camera operator's desired location. In this manner, the camera plate can be repositioned for low-profile filming to direct the field-of-view of the camera to ensure that the system is within the field of view while filming.

Sidebar 30 is attached to wheel carriages 20a and 20c by attachment latches 36. Sidebar 30 includes an extension plate located about two-thirds of its length from wheel carriage 20c for attaching the central bar 34 thereto. Sidebar 30 has an attachment hole for the moveable camera plate 26. Sidebar 32 is attached to wheel carriages 20a and 20b by attachment latches 36 (e.g., t-knobs).

The fixed central bar 34 is attached to an extension plate, located at two-thirds of its length away from wheel carriage 20b. There is also an attachment hole on sidebar 32 located at one-third of its length away from wheel carriage 20b, which is the third location for the moveable camera plate 26 to be positioned. Sidebar 28 is attached to wheel carriages 20b and 20c by attachment latches. The moveable camera plate 26 is attached to the extension plate extending from the center of sidebar 28.

Figure 6:
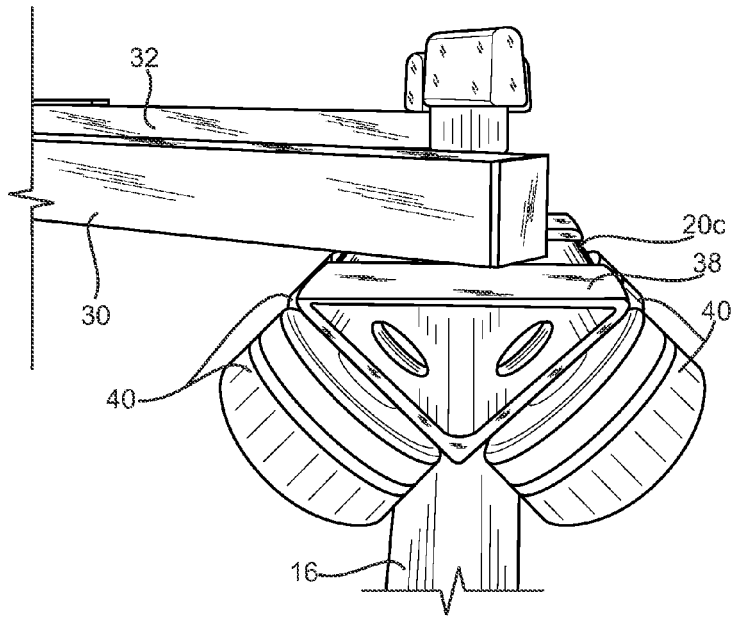
FIG. 6 is a perspective view of a wheel carriage of the dolly assembly of FIG. 1, depicting the wheel carriage positioned on the track.

With reference now to FIG. 6, wheel carriage 20a-c each includes a bar 38 having a triangular cross-section terminating in a tip, oriented towards the track. Each bar includes top planar sections at opposing ends of the bar, defining a top opening therebetween for receiving a leg of the tripod. The sidebars 28, 30 are attached to the top planar sections of the wheel carriage by attachment latches. The angled sidewalls of the bar facilitate secure support of various types of tripods, having differing sizes of feet. In this manner, the wheel carriage can securely support tripod bases of varying sizes, as well as facilitate easy assembly.

The wheel carriages 20a-c each includes four wheels 40 attached to the opposing sidewalls of the bar 38, two on each sidewall. The wheels are oriented to contact opposing sides of the railing of the track 16. There are two wheels attached to each sidewall at opposing ends, to aid in providing stable support of the dolly along the track.

Figure 5:
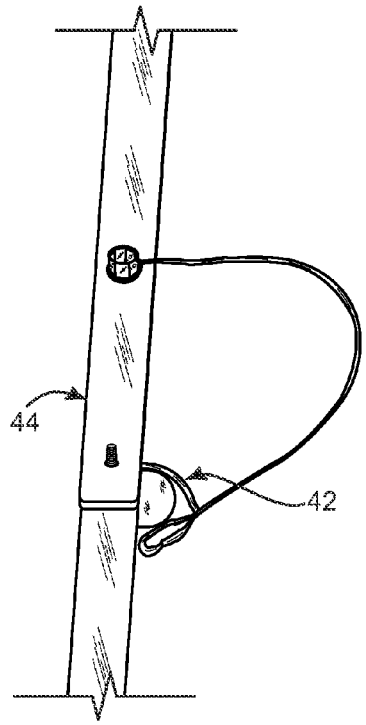
FIG. 5 is a perspective view of a portion of the track of FIG. 1, depicting a foldable cross member having a quick-release pin inserted in to apertures of first and second portions of the cross member for holding the cross member.

With reference now to FIG. 5, the track assembly 14 includes a plurality of cross members that extend between the tracks 16, 18. The cross members include first and second portions, pivotally attached to each of the tracks and coupled to each other at an intermediate region of the cross member. More particularly, the cross members include a quick release pin 42, that projects through apertures of the first and second portions to hold the cross member in a locked position. To collapse the track, the pin is removed, enabling the user to fold the cross members at the intermediate region.

The track assembly 14 further includes a locking brace 44 that extends from a first rail 16 to an end cross member. The locking brace aids in keeping the rails a prescribed distance from each other along their entire length. A first end of the locking brace is attached to the rail via a nut and bolt. The second end of the locking brace defines an aperture positioned and sized to receive a portion of the quick-release pin 42 of the end cross member. In other embodiments, the locking brace can be positioned at various locations along the length of the track assembly.

In other embodiments, curved track sections can be used, as required, in which the track includes a pair of parallel curved rails. In selected embodiments, the dolly can be optimized for use with curved sections. In an exemplary embodiment, the wheel carriages can be configured to have an axis of freedom relative to the dolly base to enable smooth traverse along the curved track allowing the camera to remain steady while filming. For example, the wheel carriages can be pivotally mounted relative to the base, such that the wheel carriages can move about an axis of rotation generally perpendicular to the base. In addition, each wheel carriages can be configured with two wheels. With two wheels on each wheel carriage, the dolly can be configured such that the wheel carriages are allowed to pivot with the curvature of the track without affecting the dolly assembly, allowing for movement along a curved or straight track without forgoing the necessary smoothness and continuity of the system on either type of track. In yet other embodiments, the wheel carriages can be configured with three more wheels to facilitate travel along curved tracks.

In yet another exemplary embodiment, the wheel carriages can be configured such that each wheel is mounted to the carriage bar to enable radial displacement of the wheel relative to the carriage bar. In this manner, the wheels can displace to accommodate curved sections of track, without forgoing the necessary smoothness and continuity of the system. For example, an extension joint added between the wheels and the wheel carriage with a ball-bearing pivot connecting the wheel to the extension joint could be used.

Figure 7:
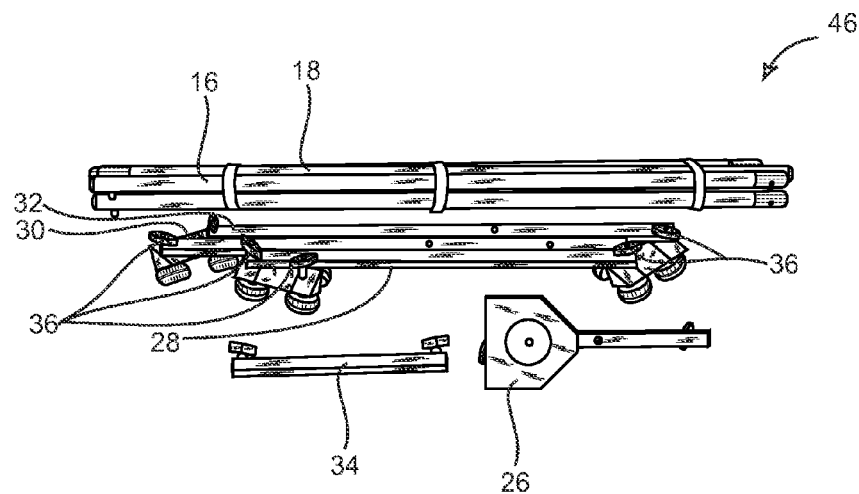
FIG. 7 is a perspective view of the dolly and track system of FIG. 1, depicting the system in a collapsed mode for storage and travel.

FIG. 7 shows the dolly and track system 10 in a storage mode 46. The moveable camera plate 26 and the fixed central bar 34 can be detached from the remaining portions of the dolly. To collapse the dolly, the latches 36 are removed from the fixed central bar and the moveable camera plate and these pieces are removed. Next, the attachment latch connecting sidebar 30 to carriage 20c is removed. Sidebar 30 is folded until parallel with sidebar 32. Then slide sidebar 30 and 32 until parallel with sidebar 28, resulting in the collapsed dolly.

Figure 8:
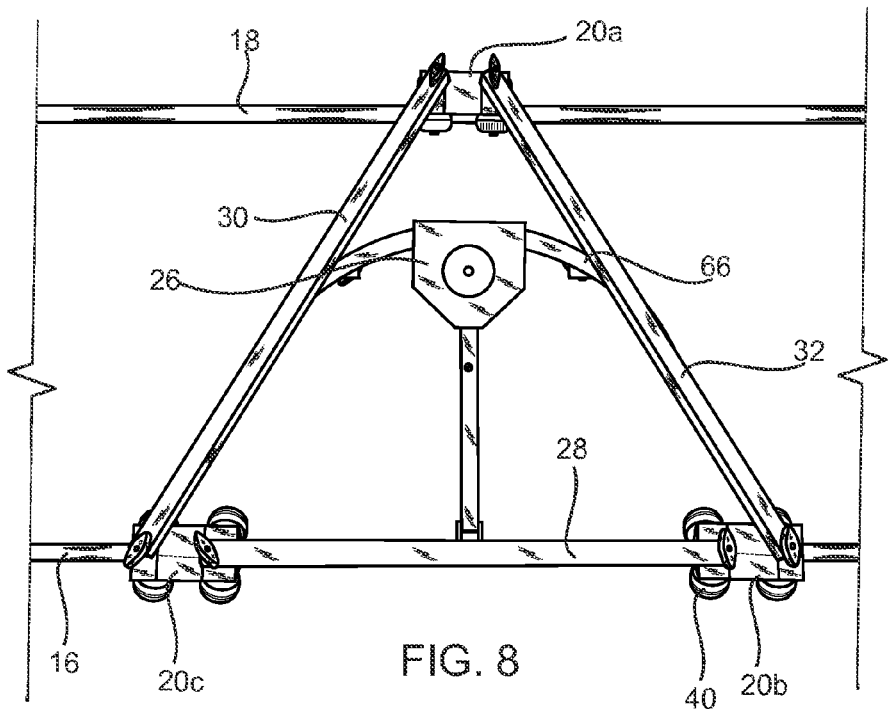
FIG. 8 is a perspective view of a second embodiment of a dolly and track system in accordance with the present invention, depicting a dolly assembly having an arcuate bar to enable adjustable positioning of a camera plate.

With reference now to FIG. 8, a dolly assembly 50 is shown having an arcuate bar 66 spanning along a prescribed length and attached to sidebars 30, 32. The dolly further includes a camera plate 26 configured to slide along the arcuate bar to enable adjustable positioning of the camera plate along the length of the bar so that the user can position the camera plate at the desired location along the bar.

Figure 9:
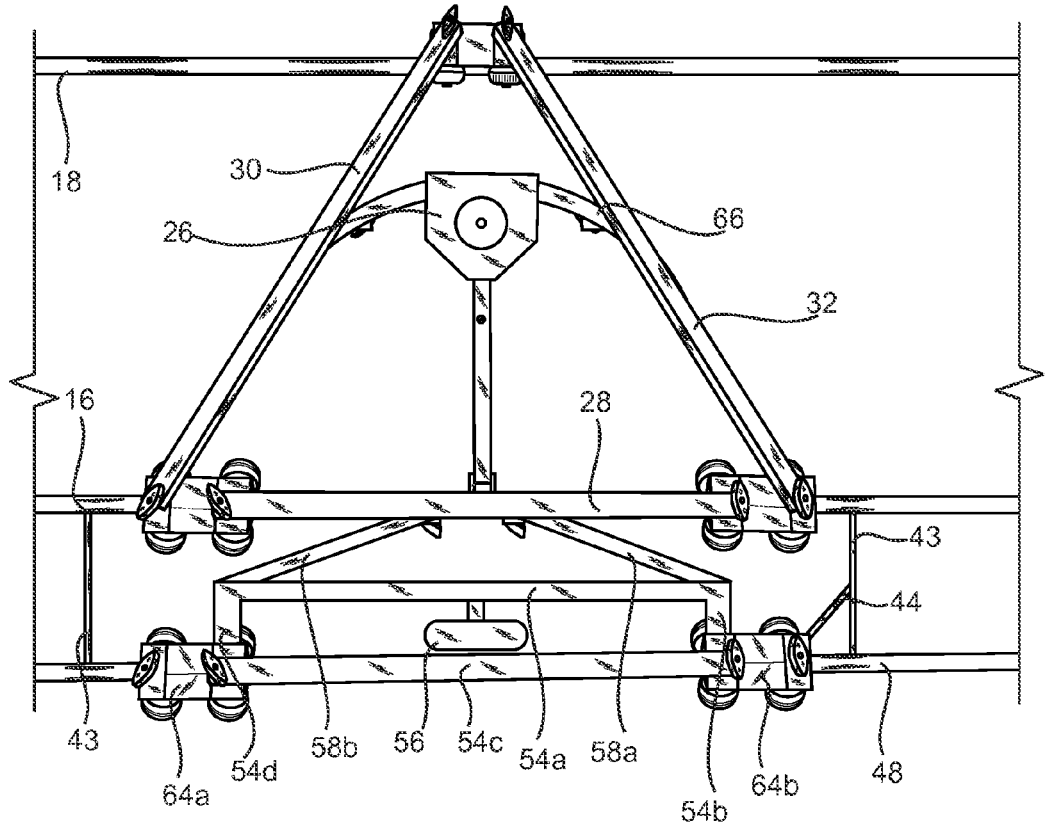
FIG. 9 is a perspective view of a third embodiment of a dolly and track system in accordance with the present invention, depicting a dolly assembly having a seat for a cameraman configured to travel along a third rail of the track assembly.

With reference now to FIG. 9, a dolly and track system 8 is shown having a seat 52 for a camera operator configured to travel along a third rail 48 of the track assembly. The third rail is connected in parallel at a prescribed distance from the first 16 and second 18 rails. The dolly assembly includes a seat base 56 having four bars 54a-d and two support bars 58a-b that extend from the seat base to the dolly base 12. The dolly assembly 50 further includes wheel carriages 64a-b disposed below the seat base to ride on the third rail. In this manner, the camera operator can glide along the track with the dolly assembly to seamlessly adjust the view angle of the camera 24 while the entire system is in motion.

It should be appreciated from the foregoing that the present invention provides a dolly and track system 10 configured to enable tripod-mounted camera angles as well as low profile camera mountings. The camera plate 26 can be positioned at prescribed locations on the dolly assembly 12 to enable optimum view angles without concern for capturing the track 16 or 18 or dolly in the field of view, particularly when shooting from a low profile. In this manner, the system provides users with multiple filming options, to include tripod 22 use and low-profile filming, in a compact system.

Although the invention has been disclosed in detail with reference only to the exemplary embodiments, those skilled in the art will appreciate that various other embodiments can be provided without departing from the scope of the invention. Accordingly, the invention is defined only by the claims set forth below.

What is claimed is:

1. A dolly and track system, comprising:
a track assembly having pair of parallel rails spaced a prescribed distance apart; and
a dolly assembly having a triangular base, three wheel carriages disposed at the corners of the base to engage the parallel rails, and a moveable camera plate having a pivot arm attached to the base and configured to be secured at multiple locations on the base wherein the dolly assembly defines a plurality of recesses positioned for receiving legs of a camera tripod, enabling use of the dolly with two cameras simultaneously in which a first camera is mounted on the tripod and a second camera is mounted on the camera plate.

2. A dolly and track system as defined in claim 1, wherein the triangular base includes a three base bars, each bar having ends removably coupled to the wheel carriages and further having central bar extending between two of the base bars, positioned to provide a securement location for the camera plate.

3. A dolly and track system as defined in claim 1, wherein the track assembly includes a plurality of cross members that extend between the parallel rails, the cross members having a folding joint in an intermediate region thereof to enable stowage of the track assembly, the track assembly and further includes a locking brace configured to extend from a rail of the parallel rails to a cross member of the plurality of cross members.

4. A dolly and track system as defined in claim 1, wherein the base of the dolly assembly further includes an arcuate bar extending between opposing sides of the base and positioned to enable the camera plate to travel along the length of the arcuate bar to provide multiple securement locations for the camera plate.

5. A dolly and track system as defined in claim 1, wherein the wheel carriages each include a plurality of wheels configured to engage opposing sides of the corresponding rail, and the wheel carriage defines a recess for receiving a leg of a camera tripod.

6. A dolly and track system as defined in claim 5, wherein the wheel carriages are configured for movement about an axis of rotation generally perpendicular to the base of the dolly assembly.

7. A dolly and track system as defined in claim 5, wherein the wheel carriages each include a pair of angled sidewalls terminating in a tip proximate to the corresponding rail, and the plurality of wheels are attached generally parallel to a corresponding sidewall.

8. A dolly and track system as defined in claim 7, wherein the plurality of wheels are mounted for radial displacement along the axis of rotation relative to the corresponding sidewall.

9. A dolly and track system, comprising:
a track assembly having pair of parallel rails spaced a prescribed distance apart, a plurality of cross members extending between the parallel rails that each include folding joint in an intermediate region thereof, and locking brace extending from a rail of the parallel rails to a cross member of the plurality of cross members; and
a dolly assembly having a triangular base including three base bars forming three sides of the base, three wheel carriages disposed at the corners of the base to engage the parallel rails, a central bar extending between two opposing sides of the base, and a moveable camera plate having a pivot arm attached to the base and configured to be secured at multiple locations on the base, including an intermediate region of the central bar wherein the dolly assembly defines a plurality of recesses positioned for receiving the legs of a camera tripod, enabling use of the dolly with two cameras simultaneously in which a first camera is mounted on the tripod and a second camera is mounted on the camera plate.

10. A dolly and track system as defined in claim 9, wherein the wheel carriages each include a plurality of wheels configured to engage opposing sides of the corresponding rail, and the wheel carriage defines a recess for receiving a leg of a camera tripod.

11. A dolly and track system as defined in claim 9, wherein the wheel carriages are configured for movement about an axis of rotation generally perpendicular to the base of the dolly assembly.

12. A dolly and track system as defined in claim 11, wherein the wheel carriages each include a pair of angled sidewalls terminating in a tip proximate to the corresponding rail, and the plurality of wheels are attached generally parallel to a corresponding sidewall.

13. A dolly and track system as defined in claim 12, wherein the plurality of wheels are mounted for radial displacement along the axis of rotation relative to the corresponding sidewall.

14. A dolly and track system as defined in claim 9, wherein the track assembly further includes a third rail generally spaced apart from and generally parallel to the pair of parallel rails, and the dolly assembly further includes a seat base configured to travel along the third rail in which the seat base is coupled to the triangular base to move along such that the seat base and the triangular base travel together along the track assembly.

15. A dolly and track system as defined in claim 14, wherein camera base includes a plurality of wheel carriages configured to engage the third rail.

16. A dolly and track system, comprising:
a track assembly having pair of parallel rails spaced a prescribed distance apart; and
a dolly assembly having a base, three wheel carriages coupled to the base to engage the parallel rails, and a moveable camera plate having a pivot arm attached to the base and configured to be secured at multiple locations on the base, the dolly assembly defining a plurality of recesses positioned for receiving legs of a camera tripod to enable use of the dolly with two cameras simultaneously in which a first camera is mounted on the tripod and a second camera is mounted on the camera plate.

17. A dolly and track system as defined in claim 16, wherein the track assembly further includes a third rail generally spaced apart from and generally parallel to the pair of parallel rails, and the dolly assembly further includes a seat base configured to travel along the third rail in which the seat base is coupled to the base to move along such that the seat base and the base travel together along the track assembly.

18. A dolly and track system as defined in claim 16, wherein the wheel carriages each include a plurality of wheels configured to engage opposing sides of the corresponding rail, and each wheel carriage defines one of the plurality of recesses for receiving a leg of a camera tripod.

19. A dolly and track system as defined in claim 18, wherein the wheel carriages each include a pair of angled sidewalls terminating in a tip proximate to the corresponding rail, and the plurality of wheels are attached generally parallel to a corresponding sidewall.

* * * * *